(12) United States Patent
Wilkerson et al.

(10) Patent No.: US 6,535,158 B2
(45) Date of Patent: Mar. 18, 2003

(54) KINEMATIC ANALYSIS OF CONICALLY SCANNED ENVIRONMENTAL PROPERTIES

(75) Inventors: Thomas D. Wilkerson, Logan, UT (US); Jason A. Sanders, American Fork, UT (US); Ionio Q. Andrus, Logan, UT (US)

(73) Assignee: Utah State University Research Foundation, North Logan, UT (US)

( * ) Notice: Subject to any disclaimer, the term of this patent is extended or adjusted under 35 U.S.C. 154(b) by 0 days.

(21) Appl. No.: 09/809,339

(22) Filed: Mar. 15, 2001

(65) Prior Publication Data

US 2002/0035444 A1 Mar. 21, 2002

Related U.S. Application Data

(60) Provisional application No. 60/189,512, filed on Mar. 15, 2000.

(51) Int. Cl.[7] .................................................. G01S 13/95
(52) U.S. Cl. ............................. 342/26; 342/73; 342/74; 342/75; 342/78; 342/104; 342/107; 342/118; 342/147; 342/158; 342/195; 356/4.01; 356/141.1; 367/87; 367/89; 367/90; 367/99
(58) Field of Search .............................. 342/26, 27, 28, 342/73–81, 104–109, 115, 118, 147, 156, 157, 158, 175, 189–197, 52–59; 250/339.11; 356/27, 28, 28.5, 3, 3.01–5.15, 141.1; 73/170.01, 170.11–170.16; 367/87–116

(56) References Cited

U.S. PATENT DOCUMENTS

| | | | |
|---|---|---|---|
| 3,110,024 A | * | 11/1963 | Jennings ....................... 342/78 |
| 3,553,438 A | | 1/1971 | Blitz et al. |
| 3,632,868 A | | 1/1972 | Gaffard et al. |
| 3,795,003 A | | 2/1974 | Meek et al. |
| 3,983,482 A | | 9/1976 | Doherty |
| 3,984,685 A | * | 10/1976 | Fletcher et al. ......... 250/339.11 |
| 4,224,622 A | | 9/1980 | Schmidt |
| 4,723,123 A | | 2/1988 | Marlow et al. |
| 5,059,967 A | | 10/1991 | Roos |
| 5,187,491 A | | 2/1993 | Schuss et al. |
| 5,724,125 A | | 3/1998 | Ames |
| 5,796,471 A | | 8/1998 | Wilkerson et al. |
| 6,034,760 A | | 3/2000 | Rees |
| 6,137,437 A | * | 10/2000 | Lin et al. .................... 342/104 |

* cited by examiner

Primary Examiner—Bernarr E. Gregory
(74) Attorney, Agent, or Firm—Clayton, Howarth & Cannon, P.C.

(57) ABSTRACT

A method for determining the velocity of features such as wind. The method preferably includes producing sensor signals and projecting the sensor signals sequentially along lines lying on the surface of a cone. The sensor signals may be in the form of lidar, radar or sonar for example. As the sensor signals are transmitted, the signals contact objects and are backscattered. The backscattered sensor signals are received to determine the location of objects as they pass through the transmission path. The speed and direction the object is moving may be calculated using the backscattered data. The data may be plotted in a two dimensional array with a scan angle on one axis and a scan time on the other axis. The prominent curves that appear in the plot may be analyzed to determine the speed and direction the object is traveling.

113 Claims, 4 Drawing Sheets

KINEMATIC ANALYSIS OF CONICALLY SCANNED ENVIRONMENTAL PROPERTIES

CROSS-REFERENCE TO RELATED APPLICATIONS

This application claims the benefit of U.S. Provisional Application Ser. No. 60/189,512, filed Mar. 15, 2000, and U.S. Provisional Application filed Mar. 9, 2001, both of which are entitled "Kinematic Analysis of Conically Scanned Environmental Properties," both of which are hereby incorporated by reference herein in their entireties, including but not limited to those portions that specifically appear hereinafter.

STATEMENT REGARDING FEDERALLY SPONSORED RESEARCH OR DEVELOPMENT

This invention was primarily funded by independent research and development funds provided by the Space Dynamics Laboratory of the Utah State University Research Foundation. Partial funding was provided by NASA Cooperative Agreement NCC5-219. Partial funding was also provided by a Rocky Mountain Space Consortium grant. The government may have certain rights in the invention.

BACKGROUND OF THE INVENTION

1. The Field of the Invention

The present invention relates generally to methods for performing kinematic analyses of environmental properties, and more particularly, but not necessarily entirely, to methods for detecting the speed and direction an object is traveling using conically scanned sensors.

2. Description of Related Art

It is often desirable to determine the motion characteristics of environmental features. For example, wind speed and direction are important to a number of disciplines, including scientific fields such as meteorology and atmospheric research as well as applied fields such as military and commercial travel. In these disciplines it is useful to have information regarding atmospheric wind speeds and directions, particularly at numerous and various points. However, it has often proven difficult to accurately, precisely and efficiently make such measurements.

Basic methods of wind speed and direction measurement include the use of balloons, and wind vanes or anemometers mounted on towers. Balloons may be used to approximate general wind speeds and directions based on their drift rates. The rate with which a wind vane rotates also indicates wind speed and the direction the vane points indicates wind direction. These methods are limited in that they only provide approximate wind speeds and directions for limited areas. The balloon only provides information regarding wind speeds and directions for that area over which it drifts and a vane for the location where it is fixed. Another limitation of the balloon and wind vane methods is the inability to gather information regarding wind speeds and directions at remote locations, particularly over the oceans where there are great expanses of water.

It is well known that the earth's atmosphere is very complex and that wind speeds and directions may vary significantly at different altitudes within the same area, as well as varying from one area to the next. It would be an advantage to measure wind speeds and directions at a variety of altitudes, at numerous locations over a large area, and at remote locations which are difficult to reach. It would be a further advantage to make such measurements over a short period of time, in order to have a global understanding of the interrelationships of atmospheric conditions within limited windows of time.

Another technique for determining the wind velocity at an altitude, which overcomes some of the shortfalls of the known wind measurement procedures, uses a lidar system.

Lidar is an apparatus, similar in operation to radars, but having a transmitter which emits laser light instead of microwaves; lidar emits a laser beam which impinges upon an object and is backscattered, the backscattered light then enters into a receiver and is analyzed. Lidars have provided hope for a viable approach to the measurement of atmospheric wind speeds and directions because the backscattered light can provide information about the characteristic attributes of the object, such as distance, direction, or speed. The speed of the object has previously been determined from what is known as the Doppler shift in the frequency of backscattered light; that is, the speed of an object is determined from comparing the frequency of the light before and after it is backscattered, where the shift in the frequency of the light is a function of the speed of the object relative to the line of sight of the impinging light.

The direction of an object is determined from what is known as vector analysis; that is, the direction of an object is determined from comparing the velocity (or magnitude of the direction of movement) of an object from at least one point of reference, where at least two measurements of the object's speed provides a resultant measurement of direction.

A problem in the art has been encountered in using lidar to gather information regarding small objects at great distances. It has proven difficult to produce lasers of a sufficiently narrow and clearly defined frequency so as to be able to clearly observe and evaluate frequency shifts in the backscattered light.

The prior art is thus characterized by several disadvantages that are addressed by the present invention. The present invention minimizes, and in some aspects eliminates, the above-mentioned failures, and other problems, by utilizing the methods and structural features described herein.

In view of the foregoing state of the art, it would be an advancement in the art to provide a method for kinematic analysis of conically scanned environmental properties which is simple to use. It would also be an advancement in the art to provide a method for kinematic analysis of environmental properties which does not require measurement of Doppler shifts in sensor signal frequencies. It would be a further advancement in the prior art to provide a method for kinematic analysis of environmental properties which allows measurement of wind speed and direction over a broad area, and throughout a vertical profile, and which can be used as a calibration and validation system for space based wind measurement systems.

BRIEF SUMMARY AND OBJECTS OF THE INVENTION

It is therefore an object of the present invention to provide a method for kinematic analysis of conically scanned environmental properties which is simple to use.

It is another object of the present invention to provide such a method for kinematic analysis of environmental properties which does not require measurement of Doppler shifts in sensor signal frequencies.

It is a further object of the present invention, in accordance with one aspect thereof, to provide a method for kinematic analysis of environmental properties which allows measurement of wind speed and direction over a broad area, and which can be used as a calibration and validation system for space based wind measurement systems.

It is an additional object of the invention, in accordance with one aspect thereof, to provide a method for kinematic analysis of environmental properties which allows measurement of wind speed and direction throughout a vertical profile.

The above objects and others not specifically recited are realized in a specific illustrative embodiment of a method for determining the speed and direction a feature is traveling. The method preferably includes producing sensor signals, transmitted sequentially and not simultaneously, and projecting the sensor signals along straight lines lying on the surface of a conical shape. The conical surface is covered by continuous rotation of the transmission path, or by closely-spaced steps in time. The sensor signals may be in the form of lidar, radar or sonar for example. As the sensor signals are transmitted, the signals contact objects and are backscattered. The backscattered sensor signals are received to determine the location of objects as they pass through the transmission path. The speed and direction the object is moving may be calculated using the backscattered data. In one embodiment, the data may be plotted in a two dimensional array with a scan angle on one axis and a scan time on the other axis. The prominent curves in the plot of signal intensity may be matched with an arcosine curve, and analyzed to determine the speed and direction the object is traveling. The speed the object is traveling may also be determined by finding the slope of the arcosine curve at an inflection point. The direction of travel may also be determined by analyzing the extremes of the arcosine curve or the midpoints between inflection points. While the visual analysis of arcosine curves is a convenient embodiment of the kinematic conical analysis, wind speed and direction may also be determined by a non-visual mathematical analysis of the scan angle/scan time data array.

Additional objects and advantages of the invention will be set forth in the description which follows, and in part will be apparent from the description, or may be learned by the practice of the invention without undue experimentation. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which.

DETAILED DESCRIPTION OF THE PREFERRED EMBODIMENTS

Figure 1:
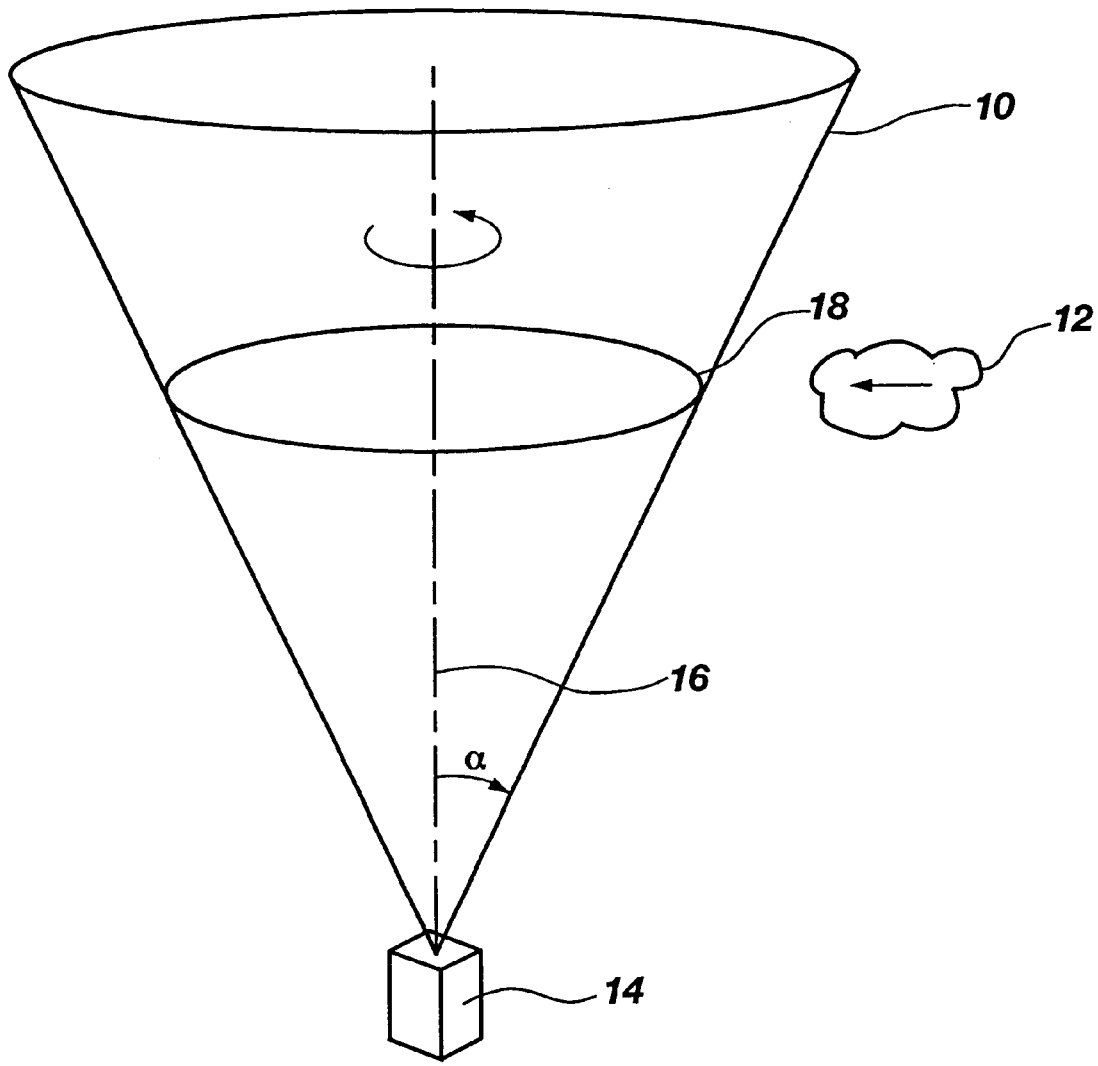
FIG. 1 is a perspective view of a conical scan projected in the atmosphere to detect the speed and direction of cloud movement.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

Referring now to FIG. 1 there is shown a perspective view of a conical scan 10 projected in the atmosphere to detect the speed and direction of movement of a feature 12 (a cloud). The conical scan 10 preferably includes sensor signals projected along lines lying on the surface of a cone. The conical surface is covered by continuous rotation of the transmission path, or closely spaced steps in time. In other words, sensor signals do not cover the entire conical scan 10 simultaneously, rather, sensor signals are projected in a straight line, and the transmission path of the sensor signals is rotated to sequentially define the conical scan 10.

Feature 12 as referred to herein may include a variety of different objects such as clouds, water droplets, ice, airborne particles, pollutants, aircraft, wildlife or vehicles for example. The conical scan 10 is produced by a signal projecting and receiving device 14. The signal projecting and receiving device 14 may be one of a variety of devices known in the art for producing a sensor signal and projecting the sensor signal along a transmission path. The sensor signal is capable of contacting the feature 12 when the feature 12 is located in the transmission path, and being returned or backscattered by contact with the feature 12 to be returned to the signal projecting and receiving device 14. The sensor signal as referred to herein may include a continuous signal or a plurality of signal pulses.

The signal projecting and receiving device 14 may include active, range resolving, systems which determine the distance to the observed feature, or passive sensors which do not provide information related to the distance to the observed feature. Passive sensors merely provide information related to the angular velocity of the feature transverse to an axis 16 of the conical scan 10. In situations where passive sensors are utilized, the distance to the observed feature must be determined in some other manner.

Examples of active sensors include systems such as radar, lidar, or sonar. Radar is a device or system consisting usually of a synchronized radio transmitter and receiver that emits radio waves and processes their reflections for display and is used especially for detecting and locating objects or surface features. As discussed above, lidar is a device that is similar in operation to radar but emits pulsed laser light instead of radio waves. The acronym lidar stands for "light detection and ranging" and as used herein encompasses all such instruments which may also be referred to elsewhere as laser radar, laser flourosensor, and laser bathymeter for example. Sonar is a method or device for detecting and locating objects, especially underwater, by means of sound waves sent out to be reflected by the objects.

Passive sensors may include radiometers and nuclear particle detectors for example. Radiometers are instruments for detecting and usually for measuring the intensity of radiant energy, whereas nuclear particle detectors usually measure the radioactivity of an object.

Sensor signals from systems such as those described above may be used to determine the speed and direction a feature 12 is traveling in accordance with the methods of the present invention. For example, the measurement of wind speed may be determined at a given altitude as referenced in FIGS. 1 and 2 where a scan path, in the form of a scan circle 18, is shown at a given altitude as a cross-section through the conical scan 10.

Figure 2:
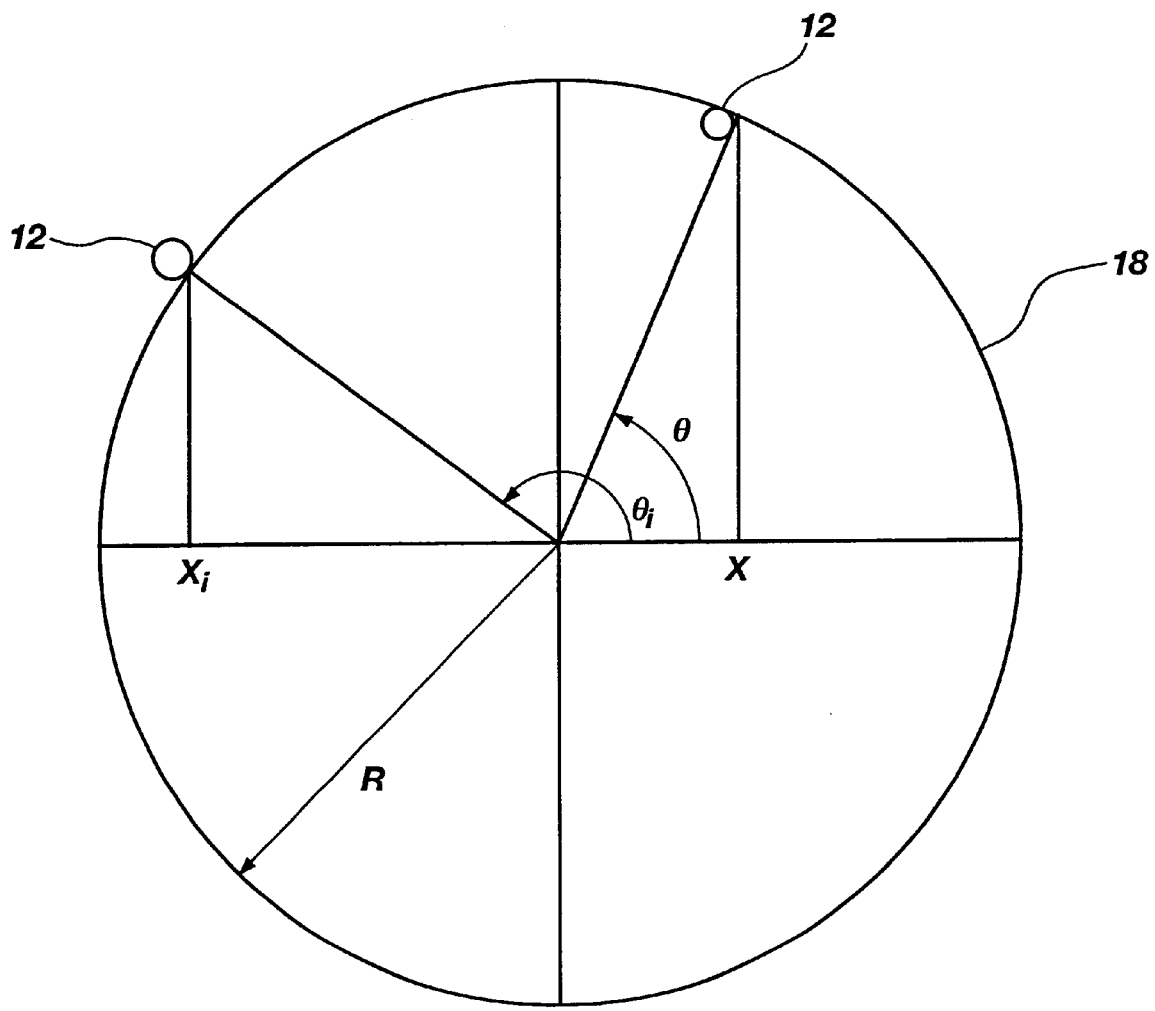
FIG. 2 is a plan view of a feature as it contacts a scan circle and the corresponding coordinates.

As shown in FIG. 2, a feature 12 traveling at a constant velocity v, is passing through a scan circle 18 having a radius R. The feature 12 has an initial contact point with the scan circle 18 at $\theta_{initial\ (i)}$. The initial contact point is detected by the signal projecting and receiving device 14, as the sensor signal contacts the feature 12 and is returned or backscattered to the signal projecting and receiving device 14. As the feature 12 travels through the scan circle 18, the feature 12 has a subsequent contact at time t, with the scan circle 18 at $\theta$, which is also detected by backscattered sensor signals received by the signal projecting and receiving device 14. The corresponding Cartesian coordinates are:

$X_i = R \cos(\theta_i)$, $X = R \cos(\theta)$, and $X = vt + X_i$

Figure 4:
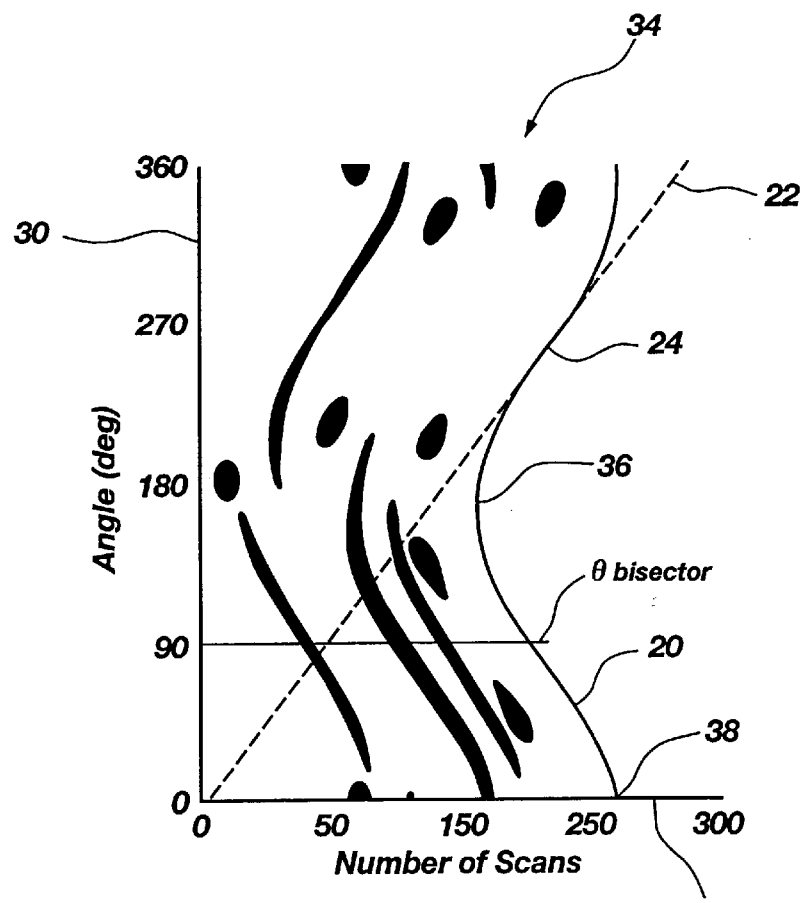
FIG. 4 is a plot of the wave image corresponding to the cloud field of FIG. 3.

Using these equations, the angle $\theta$ can be solved for in terms of the velocity, v, and the number of rotations, n, since the initial time as:

$$\theta(n,\ v) = \arccos\ [(vn/fR) + \cos(\theta_i)]$$

where t=n/f, and f is the rotational frequency of the scanning sensor. An exemplary arcosine curve 20 of the above function is plotted as shown in FIG. 4. The speed of the feature 12 may be determined by the slope 22 of the arcosine curve 20 at an inflection point 24. The slope 22 is defined as $d\theta/dn$. The speed is then:

$$v = fR \cdot |d\theta/dn|,$$

where the vertical bars represent the mathematical absolute value of $d\theta/dn$.

Thus, the speed and direction of travel of the feature 12 may be determined by finding $\theta_i$ and $\theta$ where a feature 12 enters and exits the scan circle 18. However, the task of identifying where and when a feature 12 enters and exits the scanning circle 18 is very challenging in some situations. For example, some of the issues that lead to these challenges include the fact that some features 12 such as clouds change as the cloud passes through the middle of the scan circle 18. Additionally, clouds are not discrete nor well defined, and cloud geometries play a role in determining entry and exit angles.

Figure 3:
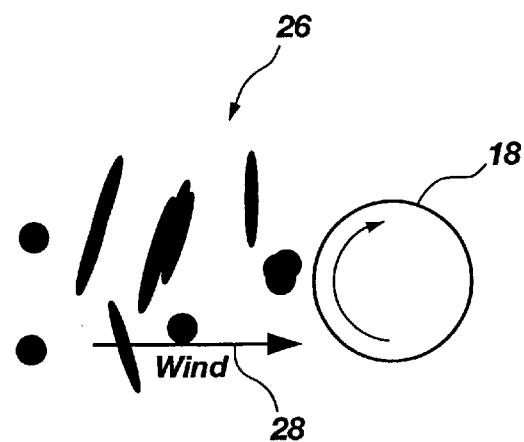
FIG. 3 is a schematic plan view of a cloud field as it approaches a scan circle.

The method of determining the speed and direction of the feature 12 may be simplified by using a slope-matching procedure in applications such as for cloud fields generally indicated at 26 in FIG. 3. As the wind 28 blows the cloud field 26 across the scan circle 18, backscatter information may be received by the signal projecting and receiving device 14. The information may be plotted as shown in FIG. 4 in a two dimensional array 34 with the scan angle 30 in one dimension, and the scan time 32 in the other dimension. The scan angle 30 is measured as an azimuthal angle in a plane perpendicular to the conical axis 16 such as angle $\theta$ in FIG. 2 for example. It will be appreciated that the scan time 32 may be expressed as the number of scans, where the number of scans are correlated with time. These plots are called "wave-images." These wave images contain sufficient information to derive the horizontal speed vector. Moreover, data may be collected for all ranges in a vertical profile, so that speeds can be found for all elevations. The two-dimensional array 34 shows characteristic curves of the cloud field 26 which, in this case, have arcosine form. An arcosine curve 20 may be matched visually to the two-dimensional array 34 from which the slope 22 at the inflection point 24 may be determined to find the speed of the cloud field 26. Also the extremes of the arcosine curve 20 at 36 and 38 can be used to indicate the direction of the movement of the cloud field 26. The leftmost extreme 36 of the arcosine curve 20 corresponds to the scan angle 30 from which the movement of the cloud field 20 is originating, and the rightmost extreme 38 corresponds to the scan angle 30 to which the cloud field 26 is moving.

As an alternative to visually fitting the arcosine curve 20 to the two-dimensional array 34, an automated procedure may be used. For example, pattern recognition analyses known in the art may be used to automatically fit the arcosine curve 20 to the backscattered information received by the signal projecting and receiving device 14. Automatic pattern recognition analyses may improve the quality of the speed and direction values obtained by reducing the subjectivity employed by visual curve matching.

In one preferred embodiment, the signal projecting and receiving device 14 is a lidar system. The lidar system preferably produces a sensor signal comprising plurality of light pulses at a rate known in the art such as 5000 Hz. The sensor signals may be projected into the atmosphere to form the conical scan 10 at an angle $\alpha$, as shown in FIG. 1, of between five and eighty-five degrees from the axis 16 of the conical scan 10. Preferably, the sensor signals are projected to form a cone angle $\alpha$ of between fifteen and forty-five degrees from the axis 16. The sensor signals are preferably transmitted with a scan or sweep frequency of between one and ten scans per minute. More preferably, the scan frequency is approximately six scans per minute. However, it will be appreciated by those skilled in the art that other scan frequencies may be used within the scope of the present invention.

The lidar is preferably configured to receive backscatter data broken down into particular segments of the conical scan 10. For example, the altitude or range resolution may be separated into vertical segments having a desired length such as approximately 200 meters. In other words, measurements may be retrieved for sections of atmosphere at altitudes 0–200 meters, 200–400 meters etc. Likewise, the lidar is preferably configured to receive backscatter data broken down into angular portions of the conical scan 10. Preferably, the angular resolution is within a range of 0.5 degrees to 5 degrees, and more preferably the angular resolution is 1 degree such that the conical scan 10 is divided into 360 angular portions. However, it will be appreciated by those skilled in the art that the scan frequency, cone angle $\alpha$, range resolution, angular resolution, altitude resolution, and altitude extreme may all be varied within the scope of the present invention.

Figure 5:
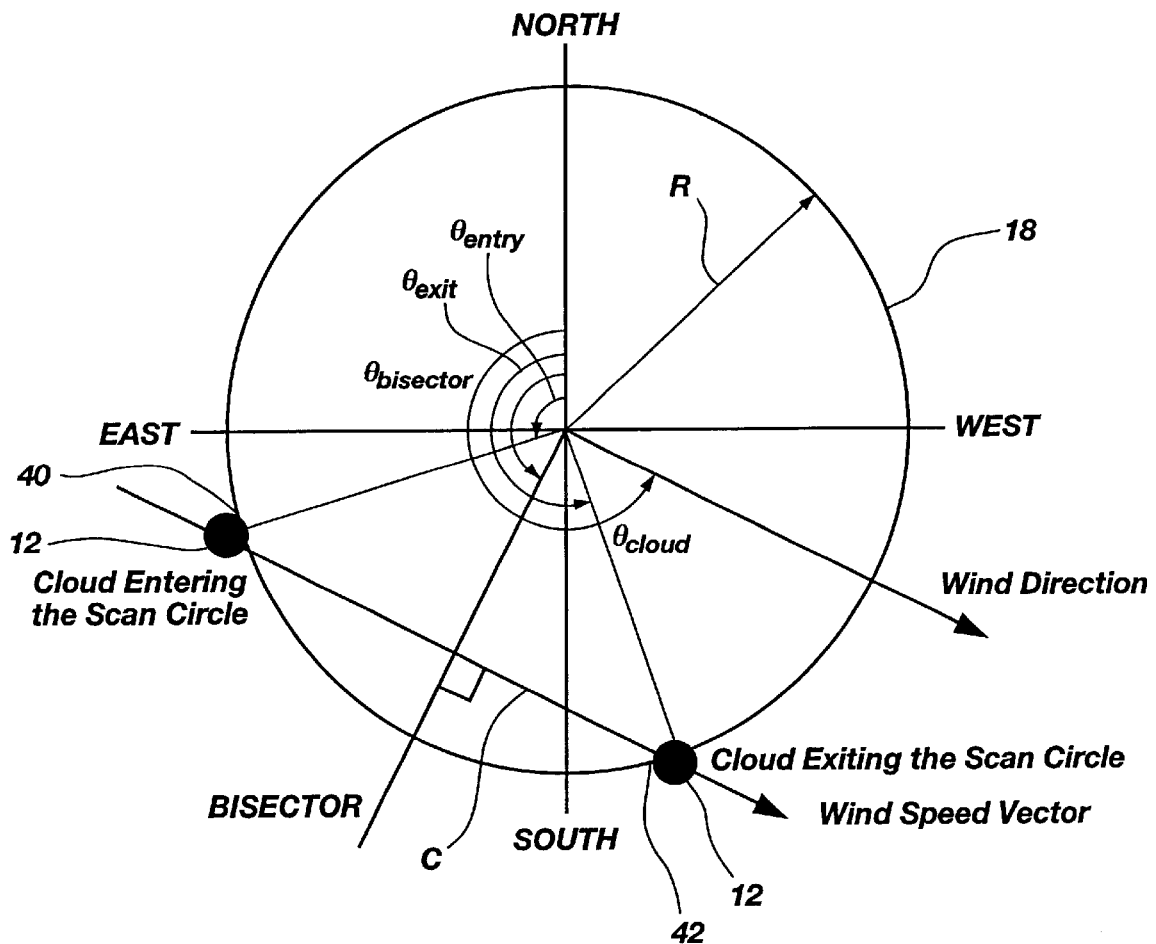
FIG. 5 is a plan view of a feature as it contacts a scan circle showing alternative coordinates used to analyze the feature.

Reference will now to made to FIG. 5 to describe an alternate embodiment of the present invention. As previously discussed, the presently preferred embodiments of the invention illustrated herein are merely exemplary of the possible embodiments of the invention, including that illustrated in FIG. 5. It will be appreciated that the alternate embodiment of the invention illustrated in FIG. 5 contains many of the same elements represented in FIGS. 1–4 and only the new or different elements will be explained to most succinctly explain the additional advantages which come with the embodiments of the invention illustrated in FIG. 5.

FIG. 5 shows the feature 12 of interest enters the scanning circle 18 at an entry point 40 having an entry scan angle $\phi_{entry}$ and exits at an exit point 42 having an exit scan angle $\phi_{exit}$. Once the entry scan angle $\phi_{entry}$ and exit scan angle $\phi_{exit}$ are identified, the average velocity can be determined by:

$$v = C/t,$$

where C is the length of the chord the feature 12 passes along within the scan circle 18 and t is the time of passage. The chord length, C, and the time, t, are given by:

$$C = R \cdot \sqrt{[\cos(\phi_{exit}) - \cos(\phi_{entry})]^2 + [\sin(\phi_{entry}) - \sin(\phi_{exit})]^2},$$

$$t = \frac{360 \cdot n - \phi_{entry} + \phi_{exit}}{\omega}$$

where $\omega$ is the scan rate, R is the radius of the scan circle 18, and n is the number of complete scans between the point of entry 40 and exit 42 on the scan circle 18. The average speed may then be calculated by:

$$v = \frac{R \cdot \sqrt{([\cos(\phi_{exit}) - \cos(\phi_{entry})]^2 + ([\sin(\phi_{entry}) - \sin(\phi_{exit})]^2} \cdot \omega}{360 \cdot n - \phi_{entry} + \phi_{exit}}$$

The wind direction, $\theta_{cloud}$, is 90° out of phase with respect to the angular bisector, $\theta_{bisector}$ of $\phi_{entry}$ and $\phi_{exit}$; so:

$$\phi_{cloud} = \theta_{bi\,sec\,tor} \pm 90°$$

Thus, the velocity and direction of the feature 12 may be determined by finding where and when a feature 12 enters and exits the scan circle 18. However, as discussed above the task of identifying where and when a feature 12 enters and exits the scanning circle 18 may be challenging in some situations.

As shown in FIG. 3 and as discussed above, as a cloud-field 26 passes through the scan circle 18, the signal projecting and receiving device 14 collects and stores data which may be plotted as wave images with the scan angle 30 on the y-axis and number of scans 32 on the x-axis (see FIG. 4). It can be seen from FIG. 5 that the bisector angle $\theta_{bisector}$ bisects the angle subtended by the entry angle $\phi_{entry}$, and exit angle $\phi_{exit}$. As the feature 12 moves through the scan circle 18, independent of the feature shape and size, it can be seen that data collected by the signal projecting and receiving device 14 are symmetric about this bisector angle $\theta_{bisector}$. As discussed in the equations above, once the bisector angle $\theta_{bisector}$ has been found, the wind vector angle can be determined. The bisector angle $\theta_{bisector}$ also aides in extracting information about the speed of the feature 12, as discussed below.

A correlation-based routine may be used to extract the bisector angle $\theta_{bisector}$ from a wave image. The basis of this routine is knowing the collected data are symmetric about the bisector angle $\theta_{bisector}$. The data for the wave image may be held in a two-dimensional array, such as that shown in FIG. 4. The routine used to find the bisector angles may use a shifting, center folding, and correlating technique. Shifting refers to performing an analysis at a particular scan angle 30 and repeating the analysis at an incremental (or shifted) scan angle 30 along the y axis. Center folding refers to folding the plot along the line through the y axis at the angle of analysis. Correlating refers to analyzing the symmetry of the folded plot. The scan angle 30 having the highest correlation of symmetry is the bisector angle $\theta_{bisector}$.

It will be understood that difficulties with the correlation method may arise because the detected features 12 change during their passage across the scan circle 18. The smaller this passage interval, the more likely is the correlation to be strong and useful. Clearly, this implies that the correlation method will generally be more reliable the smaller the cone angle $\alpha$ (FIG. 1).

The symmetry about the bisector angle allows the determination of $\phi_{entry}$ and $\phi_{exit}$ angles, and corresponding values for n. These values may be entered into the equations above to calculate the speed and direction the feature 12 is traveling. Computer routines may be used to facilitate the determination of $\phi_{entry}$ and $\phi_{exit}$ angles and corresponding n values.

It will be appreciated that although the transmission path or conical scan 10 is shown projected vertically in the sky in FIG. 1, the transmission path may be projected in any desired direction within the scope of the present invention. Furthermore, the medium through which the sensor signals travel is not confined to air, but may be any medium which allows the sensor signals to travel and be backscattered. For example, sensor signals emitted by sonar and traveling through water may be used in accordance with the principles of the present invention.

It will also be appreciated that the conical shaped transmission path 10 allows circular shaped cross sections or scan circles 18. The circular geometry facilitates calculations of the positions of the features 12 using the equations discussed above. However, other shaped transmission paths may be used with other corresponding mathematical equations within the scope of the present invention.

In accordance with the features and combinations described above, a preferred method of determining the motion characteristics of a feature 12 includes the steps of:

(a) producing a plurality of sensor signals and projecting the sensor signals in transmission paths;

(b) making a plurality of scans with the sensor signals to collectively and sequentially define the shape of a cone 10;

(c) receiving backscattered sensor signals originating from the sensor signals and being backscattered by contacting the feature 12 as the feature 12 is located in the transmission paths;

(d) producing a plot of the backscattered sensor signals in a two dimensional array 34 in which a scan angle 30 is one dimension and a scan time 32 is another dimension; and (e) performing an analysis of the prominent curves that appear in the plot to determine the speed and direction the feature is traveling.

In view of the foregoing, it will be appreciated that the present invention provides a method for kinematic analysis of conically scanned environmental properties which is simple to use. The present invention also provides a method for kinematic analysis of environmental properties which does not require measurement of Doppler shifts in sensor signal frequencies. Additionally, the present invention provides a method for kinematic analysis of environmental properties which allows measurement of wind speed and direction over a broad area, and throughout a vertical profile, and which can be used as a calibration and validation system for space based wind measurement systems.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method for determining motion characteristics of a feature, said method comprising the steps of:
   (a) transmitting a sensor signal in a transmission path;
   (b) receiving a backscattered sensor signal originating from said sensor signal and being backscattered by contacting said feature as said feature is located in said transmission path;
   (c) producing a plot of the backscattered sensor signal in a two dimensional array in which a scan angle is one dimension and a scan time is another dimension; and
   (d) analyzing prominent curves that appear in the plot to determine the motion characteristics of the feature.

2. The method of claim 1 wherein determining the motion characteristics of the feature comprises determining a speed.

3. The method of claim 1 wherein determining the motion characteristics of the feature comprises determining a direction the feature is traveling.

4. The method of claim 1 further comprising transmitting a plurality of sensor signals in a plurality of transmission paths to collectively and sequentially define the shape of a cone.

5. The method of claim 4 further comprising collecting said backscattered sensor signal in a scan circle at a plane normal to an axis of said cone shape.

6. The method of claim 5 further comprising calculating the radius of said scan circle based on the backscattered sensor signal.

7. The method of claim 4 further comprising making a plurality of scans with said sensor signals along said cone shape at a rate of between one and ten scans per minute.

8. The method of claim 7 wherein the plurality of scans are made at a rate of six scans per minute.

9. The method of claim 4 wherein the cone shape is made at an angle α of between 5 and 85 degrees from an axis of the cone.

10. The method of claim 9 wherein the cone shape is made at an angle α of between 15 and 45 degrees from the axis of the cone.

11. The method of claim 10 wherein the cone shape is made at an angle α of 45 degrees from the axis of the cone.

12. The method of claim 1 further comprising making a plurality of scans with said sensor signal along said transmission path.

13. The method of claim 12 further comprising recording the time corresponding to the scans.

14. The method of claim 1 wherein the sensor signal is produced by one of a group consisting of lidar, radar and sonar.

15. The method of claim 14 wherein said lidar has a range resolution of between 50 meters and 500 meters.

16. The method of claim 15 wherein said lidar has a range resolution of between 100 meters and 300 meters.

17. The method of claim 16 wherein said lidar has a range resolution of approximately 200 meters.

18. The method of claim 14 wherein said lidar has an angular resolution of between 0.5 degrees and 5 degrees.

19. The method of claim 18 wherein said lidar has an angular resolution of approximately 1 degree.

20. The method of claim 1 further comprising determining the position of said feature without measuring frequency shifts of the sensor signal.

21. The method of claim 1 further comprising projecting the sensor signal in the sky to determine the speed and direction of the wind.

22. The method of claim 21 wherein said feature is one of a group consisting of clouds, water droplets, ice, airborne particles, pollutants, aircraft, wildlife and vehicles.

23. The method of claim 1 further comprising determining the scan angle as an azimuthal angle where said feature contacts said scan circle.

24. The method of claim 23 further comprising calculating a velocity of the feature using an equation $v = fR \cdot |d\theta/dn|$ where v is the velocity, θ is the scan angle, n is a number of scans since an initial time, f is a rotational frequency of the scan and R is a radius of the scan circle.

25. The method of claim 1 further comprising visually identifying an arcosine curve corresponding to prominent curves that appear in the plot.

26. The method of claim 25 further comprising determining a velocity of said feature by determining a slope of the arcosine curve at an inflection point.

27. The method of claim 25 further comprising determining a direction the feature is moving by analyzing extremes of the arcosine curve.

28. The method of claim 1 further comprising identifying an arcosine curve corresponding to prominent curves that appear in the plot using an automated pattern recognition analysis.

29. The method of claim 1 further comprising analyzing said feature in a cross-sectional area perpendicular to an axis of said transmission path to determine a speed and direction of travel of said feature.

30. The method of claim 1 further comprising analyzing a plurality of cross-sectional areas perpendicular to an axis of said transmission path to determine a speed and direction of travel of features at intervals along said axis.

31. A method for determining motion characteristics of a feature, said method comprising the steps of:
   (a) transmitting a sensor signal in a transmission path;
   (b) receiving a backscattered sensor signal originating from said sensor signal and being backscattered by contacting said feature as said feature is located in said transmission path;
   (c) mathematically calculating the speed the feature is traveling based on an initial position of the feature in the transmission path and a subsequent position of the feature in the transmission path.

32. The method of claim 31 wherein determining the motion characteristics of the feature comprises determining a speed.

33. The method of claim 31 wherein determining the motion characteristics of the feature comprises determining a direction the feature is traveling.

34. The method of claim 31 further comprising transmitting a plurality of sensor signals in a plurality of transmission paths to collectively and sequentially define the shape of a cone.

35. The method of claim 34 further comprising collecting said backscattered sensor signals in a scan circle at a plane normal to an axis of said cone shape.

36. The method of claim 35 further comprising calculating the radius of said scan circle based on the backscattered sensor signals.

37. The method of claim 35 further comprising calculating a velocity of the feature using an equation $v=fR\cdot|d\theta/dn|$ where v is the velocity, $\theta$ is the scan angle, n is a number of scans since an initial time, f is a rotational frequency of the scan and R is a radius of the scan circle.

38. The method of claim 35 wherein the speed the feature is traveling is calculated by the equation $$v = \frac{R \cdot \sqrt{[\cos(\phi_{exit}) - \cos(\phi_{entry})]^2 + [\sin(\phi_{entry}) - \sin(\phi_{exit})]^2} \cdot \omega}{360 \cdot n - \phi_{entry} + \phi_{exit}}$$

where v is the speed the feature is traveling, R is a radius of the scan circle, $\phi_{entry}$ is an angle where the feature enters the scan circle, $\phi_{exit}$ is an angle where the feature exits the scan circle, $\omega$ is a rate of scan, and n is a number of complete scans between a point where the feature enters the scan circle and a point where the feature exits the scan circle.

39. The method of claim 31 further comprising making a plurality of scans with said sensor signal along said transmission path.

40. The method of claim 39 further comprising recording the time corresponding to the scans.

41. The method of claim 31 wherein the sensor signals are produced by one of a group consisting of lidar, radar and sonar.

42. The method of claim 31 further comprising determining the position of said feature without measuring frequency shifts of the sensor signals.

43. The method of claim 31 further comprising projecting the sensor signals in the sky to determine the speed and direction of the wind.

44. The method of claim 43 wherein said feature is one of a group consisting of clouds, water droplets, ice, air-borne particles, pollutants, aircraft, wildlife and vehicles.

45. The method of claim 31 further comprising analyzing said feature in a cross-sectional area perpendicular to an axis of said transmission path to determine a speed and direction of travel of said feature.

46. The method of claim 31 further comprising analyzing a plurality of cross-sectional areas perpendicular to an axis of said transmission path to determine a speed and direction of travel of features at intervals along said axis.

47. A method for determining motion characteristics of a feature, said method comprising the steps of:
   (a) transmitting a sensor signal in a transmission path;
   (b) receiving a backscattered sensor signal originating from said sensor signal and being backscattered by contacting said feature as said feature is located in said transmission path;
   (c) determining an initial position of said feature based on said backscattered sensor signals as said feature enters said transmission path;
   (d) determining a subsequent position of said feature based on said backscattered sensor signals as said feature is located in said transmission path during a subsequent time; and
   (e) analyzing said initial position of said feature and said subsequent position of said feature to derive the motion characteristics of the feature.

48. The method of claim 47 wherein determining the motion characteristics of the feature comprises determining a speed.

49. The method of claim 47 wherein determining the motion characteristics of the feature comprises determining a direction the feature is traveling.

50. The method of claim 47 further comprising transmitting a plurality of sensor signals in a plurality of transmission paths to collectively and sequentially define the shape of a cone.

51. The method of claim 50 further comprising collecting said backscattered sensor signals in a scan circle at a plane normal to an axis of said cone shape.

52. The method of claim 51 further comprising calculating the radius of said scan circle based on the backscattered sensor signals.

53. The method of claim 51 further comprising determining a scan angle as an azimuthal angle where said feature contacts said scan circle.

54. The method of claim 53 further comprising calculating a velocity of the feature using an equation $v=fR\cdot|d\theta/dn|$ where v is the velocity, $\theta$ is the scan angle, n is a number of scans since an initial time, f is a rotational frequency of the scan and R is a radius of the scan circle.

55. The method of claim 50 further comprising making a plurality of scans with said sensor signals along said cone shape path at a rate of between one and ten scans per minute.

56. The method of claim 55 wherein the plurality of scans are made at a rate of six scans per minute.

57. The method of claim 50 wherein the cone shape is made at an angle $\alpha$ of between 5 and 85 degrees from an axis of the cone.

58. The method of claim 57 wherein the cone shape is made at an angle $\alpha$ of between 15 and 45 degrees from the axis of the cone.

59. The method of claim 58 wherein the cone shape is made at an angle $\alpha$ of 45 degrees from the axis of the cone.

60. The method of claim 51 further comprising determining an entry angle where the feature enters the scan circle, determining an exit angle where the feature exits the scan circle, and a bisector angle between the entry angle and the exit angle.

61. The method of claim 60 further comprising determining a direction the feature is traveling by adding or subtracting 90 degrees from the bisector angle.

62. The method of claim 60 wherein the bisector angle is determined using a correlation based routine.

63. The method of claim 62 wherein the correlation based routine comprises a shifting, center-folding and correlating technique.

64. The method of claim 47 wherein step (e) further comprises producing a plot of the backscattered sensor signals in a two dimensional array in which a scan angle is one dimension and a scan time is another dimension.

65. The method of claim 64 further comprising visually identifying an arcosine curve corresponding to prominent curves that appear in the plot.

66. The method of claim 65 further comprising determining a velocity of said feature by determining a slope of the arcosine curve at an inflection point.

67. The method of claim 65 further comprising determining the direction the feature is moving by analyzing extremes of the arcosine curve.

68. The method of claim 64 further comprising identifying an arcosine curve corresponding to prominent curves that appear in the plot using an automated pattern recognition analysis.

69. The method of claim 47 further comprising making a plurality of scans with said sensor signal along said transmission path.

70. The method of claim 69 further comprising recording the time corresponding to the scans.

71. The method of claim 47 wherein the sensor signals are produced by one of a group consisting of lidar, radar and sonar.

72. The method of claim 71 wherein said lidar has a range resolution of between 50 meters and 500 meters.

73. The method of claim 72 wherein said lidar has a range resolution of between 100 meters and 300 meters.

74. The method of claim 73 wherein said lidar has a range resolution of approximately 200 meters.

75. The method of claim 71 wherein said lidar has an angular resolution of between 0.5 degrees and 5 degrees.

76. The method of claim 75 wherein said lidar has an angular resolution of approximately 1 degree.

77. The method of claim 47 further comprising determining the position of said feature without measuring frequency shifts of the sensor signals.

78. The method of claim 47 further comprising projecting the sensor signals in the sky to determine the speed and direction of the wind.

79. The method of claim 78 wherein said feature is one of a group consisting of clouds, water droplets, ice, airborne particles, pollutants, aircraft, wildlife and vehicles.

80. The method of claim 47 further comprising analyzing said feature in a cross-sectional area perpendicular to an axis of said transmission path to determine a speed and direction of travel of said feature.

81. The method of claim 47 further comprising analyzing a plurality of cross-sectional areas perpendicular to an axis of said transmission path to determine a speed and direction of travel of features at intervals along said axis.

82. A method for determining motion characteristics of a feature, said method comprising the steps of:
  (a) transmitting a sensor signal in a transmission path;
  (b) receiving a returned sensor signal originating from said sensor signal and being returned by contacting said feature as said feature is located in said transmission path;
  (c) producing a plot of the returned sensor signal in a two dimensional array in which a scan angle is one dimension and a scan time is another dimension; and
  (d) analyzing prominent curves that appear in the plot to determine the motion characteristics of the feature.

83. The method of claim 82 wherein determining the motion characteristics of the feature comprises determining a speed.

84. The method of claim 82 wherein determining the motion characteristics of the feature comprises determining a direction the feature is traveling.

85. The method of claim 82 further comprising transmitting a plurality of sensor signals in a plurality of transmission paths to collectively and sequentially define the shape of a cone.

86. The method of claim 85 further comprising collecting said returned sensor signals in a scan circle at a plane normal to an axis of said cone shape.

87. The method of claim 86 further comprising calculating the radius of said scan circle based on the returned sensor signals.

88. The method of claim 85 further comprising making a plurality of scans along said cone shape at a rate of between one and ten scans per minute.

89. The method of claim 88 wherein the plurality of scans are made at a rate of six scans per minute.

90. The method of claim 85 wherein the cone shape is made at an angle α of between 5 and 85 degrees from an axis of the cone.

91. The method of claim 90 wherein the cone shape is made at an angle α of between 15 and 45 degrees from the axis of the cone.

92. The method of claim 91 wherein the cone shape is made at an angle α of 45 degrees from the axis of the cone.

93. The method of claim 82 further comprising making a plurality of scans with said sensor signal along said transmission path.

94. The method of claim 93 further comprising recording the time corresponding to the scans.

95. The method of claim 82 wherein the sensor signals are produced by one of a group consisting of lidar, radar and sonar.

96. The method of claim 95 wherein said lidar has a range resolution of between 50 meters and 500 meters.

97. The method of claim 96 wherein said lidar has a range resolution of between 100 meters and 300 meters.

98. The method of claim 97 wherein said lidar has a range resolution of approximately 200 meters.

99. The method of claim 95 wherein said lidar has an angular resolution of between 0.5 degrees and 5 degrees.

100. The method of claim 99 wherein said lidar has an angular resolution of approximately 1 degree.

101. The method of claim 82 further comprising determining the position of said feature without measuring frequency shifts of the sensor signals.

102. The method of claim 82 further comprising projecting the sensor signals in the sky to determine the speed and direction of the wind.

103. The method of claim 102 wherein said feature is one of a group consisting of clouds, water droplets, ice, air-borne particles, pollutants, aircraft, wildlife and vehicles.

104. The method of claim 82 further comprising determining the scan angle as an azimuthal angle where said feature contacts said scan circle.

105. The method of claim 104 further comprising calculating a velocity of the feature using an equation $v = fR \cdot |d\theta/dn|$ where v is the velocity, $\theta$ is the scan angle, n is a number of scans since an initial time, f is a rotational frequency of the scan and R is a radius of the scan circle.

106. The method of claim 82 further comprising visually identifying an arcosine curve corresponding to prominent curves that appear in the plot.

107. The method of claim 106 further comprising determining a velocity of said feature by determining a slope of the arcosine curve at an inflection point.

108. The method of claim 106 further comprising determining the direction the feature is moving by analyzing extremes of the arcosine curve.

109. The method of claim 82 further comprising identifying an arcosine curve corresponding to prominent curves that appear in the plot using an automated pattern recognition analysis.

110. The method of claim 82 further comprising analyzing said feature in a cross-sectional area perpendicular to an axis of said transmission path to determine a speed and direction of travel of said feature.

111. The method of claim 82 further comprising analyzing a plurality of cross-sectional areas perpendicular to an axis of said transmission path to determine a speed and direction of travel of features at intervals along said axis.

112. A method for determining motion characteristics of a feature, said method comprising the steps of:
  (a) producing sensor signals comprising multiple pulses of laser light produced by a lidar system, and projecting said sensor signals in a plurality of transmission paths;
  (b) making a plurality of scans with said sensor signals to sequentially and collectively form a conical shape, and recording a time corresponding to said plurality of scans, said plurality of scans being made at a rate of between one and ten scans per minute, said conical shape being made at an angle α of between 15 and 45 degrees from an axis of the conical shape;

(c) receiving backscattered sensor signals originating from said sensor signals and being backscattered by contacting said feature as said feature is located in said transmission paths, said backscattered sensor signals being collected in a scan circle at a plane normal to said axis of said conical shape;

(d) producing a plot of the backscattered sensor signals in a two dimensional array in which a scan angle is one dimension and the scan time is another dimension, said scan angle being measured as an azimuthal angle where said feature contacts said transmission paths;

(e) matching an arcosine curve with said plot of the backscattered sensor signals using a visual technique or an automated pattern recognition analysis;

(f) determining a speed of said feature as a slope of the arcosine curve at an inflection point; and (g) determining a direction said feature is traveling as a scan angle corresponding to an extreme of the arcosine curve;

wherein the sensor signals are projected into the sky to determine the speed and direction of travel of wind; and wherein the speed and direction the wind is traveling is determined without measuring frequency shifts of the sensor signals.

113. A method for determining a speed of a moving object, said method comprising the steps of:

(a) defining a scan circle;

(b) identifying said moving object;

(c) calculating the speed of the object as the object passes said scan circle using the equation $$v=(X-X_i)/t,$$

where v is the speed, $X_i$ is an initial coordinate of the object as the object enters the scan circle, X is a final coordinate of the object as the object exits the scan circle, and t is the time required for the object to travel from $X_i$ to X.

* * * * *